United States Patent
Brinkman

(10) Patent No.: US 7,098,291 B2
(45) Date of Patent: *Aug. 29, 2006

(54) URETHANE POLYMER COMPOSITIONS

(75) Inventor: Larry Frank Brinkman, Woodstock, IL (US)

(73) Assignee: Rohm and Haas Company, Philadelphia, PA (US)

( * ) Notice: Subject to any disclaimer, the term of this patent is extended or adjusted under 35 U.S.C. 154(b) by 130 days.

This patent is subject to a terminal disclaimer.

(21) Appl. No.: 10/438,945

(22) Filed: May 15, 2003

(65) Prior Publication Data

US 2003/0232956 A1 Dec. 18, 2003

Related U.S. Application Data

(60) Provisional application No. 60/387,511, filed on Jun. 10, 2002.

(51) Int. Cl.
*C08G 18/48* (2006.01)

(52) U.S. Cl. .................. 528/74.5; 528/76; 528/83

(58) Field of Classification Search ............. 528/74.5, 528/76, 83, 59; 525/440
See application file for complete search history.

(56) References Cited

U.S. PATENT DOCUMENTS

| 4,535,142 A | 8/1985 | Brauner et al. |
| 4,742,112 A | 5/1988 | Brauner et al. |
| 5,021,535 A | 6/1991 | Vu et al. |
| 5,034,453 A * | 7/1991 | Takada et al. ............ 524/590 |
| 5,376,705 A | 12/1994 | Leys et al. |
| 5,401,785 A | 3/1995 | Kumagai et al. |
| 5,432,221 A | 7/1995 | Polaski et al. |

FOREIGN PATENT DOCUMENTS

| EP | 1153997 | 11/2001 |
| GB | 2278350 | 11/1994 |
| JP | 55-21431 | 2/1980 |
| JP | 55021431 | 2/1980 |
| WO | WO 00/49062 | 8/2000 |

OTHER PUBLICATIONS

Shrikant N. Khot, et al, "Development and Application of Trigyceride-Based Polymers and Compositions," Journal of Applied Polymer Science, vol. 82, p. 703-723, 2001.
Rainer Hofer, "Olechemical Polyols," European Coating Journal, vol. 03, p. 26-37, 2000.

* cited by examiner

*Primary Examiner*—Rachel Gorr
(74) *Attorney, Agent, or Firm*—Carl P. Hemenway

(57) ABSTRACT

A moisture-reactive hot-melt adhesive composition is provided. Particularly, a composition that includes a polyisocyanate and at least two polyols, one of which is a fatty polyol. Also provided is a method for bonding substrates using the adhesive.

10 Claims, No Drawings

URETHANE POLYMER COMPOSITIONS

This application claims the benefit of U.S. Provisional Application No. 60/387,511, filed Jun. 10, 2002.

BACKGROUND

This invention relates to urethane polymer compositions, particularly moisture-reactive hot-melt urethane polymer compositions useful as adhesives and to a method for bonding substrates with such compositions.

The use of castor oil as a component in urethane polymer compositions is known in the art, as described in *Polyurethane Handbook*, 2nd edition, edited by G. Oertel, Hanser Publishers, 1993. Castor oil is thought to provide crosslinking to the composition. U.S. patent application Ser. No. 09/843706 discloses moisture-reactive hot-melt adhesives that incorporate castor oil into a polyurethane prepolymer-forming reaction mixture containing polyol and polyisocyanate. These adhesives achieve good properties, but alternatives to castor oil are desired in order to adjust the formulation to achieve specific balance of properties.

UK Patent 2278350 discloses the use of a hydroxylated diglyceride or triglyceride of one or more long-chain ethylenically unsaturated fatty acids as the sole polyol in a cured urethane polymer composition. U.S. Pat. No. 4,742,112 discloses a polyol mixture having polyhydroxyl ricinoleate compound and $C_2$–$C_6$ hydrocarbon polymer having at least one hydroxyl group.

The problem faced by the inventor is the provision of alternatives to unmodified castor oil as one of plural polyols in a moisture-reactive hot-melt adhesive composition. In addition, it is desirable to find useful polyols other than unmodified castor oil that are derived from renewable and/or natural sources. Surprisingly, the inventor found that incorporation of various hydroxyl-functional fatty compounds other than unmodified castor oil in urethane compositions yielded moisture-reactive adhesives with useful properties.

STATEMENT OF THE INVENTION

In a first aspect of the present invention, there is provided a moisture-reactive hot-melt composition formed by admixing components comprising
  (a) at least one first polyol selected from the group consisting of polyether polyols, polyester polyols, polyester ether polyols, polyether ester polyols, and mixtures thereof;
  (b) at least one polyisocyanate; and
  (c) at least one fatty polyol selected from the group consisting of polyhydroxyl fatty acids, polyhydroxyl amides of fatty acids, polyhydroxyl esters of fatty acids, polymeric fatty polyols, and mixtures thereof; wherein said fatty polyol does not contain unmodified castor oil or any unmodified ester of ricinoleic acid.

In a second aspect of the present invention, there is provided a method for bonding substrates comprising
  (a) making a moisture-reactive hot-melt composition by a method comprising admixing components comprising at least one first polyol selected from the group consisting of polyether polyols, polyester polyols, polyester ether polyols, polyether ester polyols, and mixtures thereof; at least one polyisocyanate; and at least one fatty polyol selected from the group consisting of polyhydroxyl fatty acids, polyhydroxyl amides of fatty acids, polyhydroxyl esters of fatty acids, polymeric fatty polyols, and mixtures thereof; wherein said fatty polyol does not contain unmodified castor oil or any unmodified ester of ricinoleic acid;
  (b) heating said polymer composition;
  (c) applying said heated polymer composition to a first substrate in the presence of moisture;
  (d) contacting said applied heated polymer composition with a second substrate; and
  (e) cooling, or allowing to cool, said polymer composition.

DETAILED DESCRIPTION

The composition of this invention is a moisture-reactive hot-melt adhesive composition. By "moisture-reactive" is meant herein that the composition contains isocyanate groups which are capable of reacting with water desirably to effect an increase in the molecular weight of the adhesive composition and/or effect crosslinking of the adhesive composition so as to increase the strength properties of the adhesive subsequent to being contacted with water. By "hot-melt" is meant herein that the adhesive which may be a solid, semi-solid, or viscous mass can be advantageously heated to provide a fluid adhesive of a viscosity suitable for application to and adhesion to substrates.

The moisture-reactive hot-melt adhesive composition of the present invention is formed by admixing components which include at least one polyisocyanate, i.e., an isocyanate bearing at least two isocyanate groups. Polyisocyanates which may be used include aromatic, aliphatic, or cycloaliphatic polyisocyanates, and combinations thereof, such as, for example, m-phenylene diisocyanate, 2,4-toluene diisocyanate, 2,6-toluene diisocyanate, hexamethylene diisocyanate, tetramethylene diisocyanate, 1,4-cyclohexane diisocyanate, hexahydrotoluene diisocyanate, 1,5-naphthalene diisocyanate, 1-methoxy-2,4-phenylene diisocyanate, 4,4'-diphenylmethane diisocyanate, 2,4'-diphenylmenthane diisocyanate, 4,4'-biphenylene diisocyanate, 3,3'-dimethoxy-4,4'-biphenyl diisocyanate, 3,3'-dimethyl-4,4'-biphenyl diisocyanate, 3,3'-dimethyl-4,4'-diphenylmenthane diisocyanate, isophorone diisocyanate, 4,4',4"-triphenylmethane triisocyanate, polymethylene polyphenylene polyisocyanate, 2,4,6-toluene triisocyanate, 4,4'-dimethyl-diphenylmethane tetraisocyanate, prepolymers having Mn less than 2000 and bearing at least two isocyanate groups, and mixtures thereof. Preferred are 4,4'-diphenylmethane diisocyanate (also called 4,4'-MDI), 2,4'-diphenylmethane diisocyanate (also called 2,4'-MDI), and mixtures thereof.

The moisture-reactive hot-melt adhesive composition of the present invention is formed by admixing components which include at least one polyol. A polyol is a compound with two or more hydroxyl functions. Polyols are also known as "polyhydroxyl" compounds. Suitable polyols include a wide variety of compounds, some of which are described in *Polyurethane Handbook*, 2nd edition, edited by G. Oertel, Hanser Publishers, 1994. In addition to the hydroxyl functions, suitable polyols may contain other functionality, such as for example carbonyl, carboxyl, anhydride, unsaturation, or other functions. Suitable polyols include, for example, polyether polyols, polyester polyols, polyester ether polyols, polyether ester polyols, fatty polyols other than castor oil, and mixtures thereof. Suitable polyol(s) may be independently selected from crystalline, semi-crystalline, or amorphous polyols. Suitable polyols also include compounds with two or more hydroxyl groups per molecule which may be admixed (for example, because they are naturally-occurring compounds or derived from naturally-occurring compounds) with relatively small amounts of molecules which contain 0 or 1 hydroxyl groups but which are otherwise similar.

In the practice of the present invention, the admixture of components includes at least one polyol (herein called "first polyol") that includes one or more polyols from at least one of the following classes of polyols: polyether polyols, polyester polyols, polyester ether polyols, polyether ester polyols, or mixtures thereof. Polyols based on hydrocarbon polymers, such as, for example, hydroxyl-functional polybutadiene, are known to participate in polyurethane reactions, but they are not considered preferable as the first polyol of the present invention.

Polyester polyols suitable for use in the present invention include those formed from diacids, or their monoester, diester, or anhydride counterparts, and diols. The diacids may be saturated $C_4$–$C_{12}$ aliphatic acids, including branched, unbranched, or cyclic materials, and/or $C_8$–$C_{15}$ aromatic acids. Examples of suitable aliphatic acids include, for example, succinic, glutaric, adipic, pimelic, suberic, azelaic, sebacic, 1,12-dodecanedioic, 1,4-cyclohexanedicarboxylic, and 2-methylpentanedioic acids. Examples of suitable aromatic acids include, for example, terephthalic, isophthalic, phthalic, 4,4'-benzophenone dicarboxylic, 4,4'-diphenylamine dicarboxylic acids, and mixtures thereof. The diols may be $C_2$–$C_{12}$ branched, unbranched, or cyclic aliphatic diols. Examples of suitable diols include, for example, ethylene glycol, 1,3-propylene glycol, 1,2-propylene glycol, 1,4-butandediol, neopentyl glycol, 1,3-butanediol, hexanediols, 2-methyl-2,4-pentanediol, cyclohexane-1,4-dimethanol, 1,12-dodecanediol, diethylene glycol, and mixtures thereof. Mixtures of the various suitable polyester polyols are also suitable for use in the present invention. The preferred polyester polyols are ortho phthalate-diethylene glycol based polyester polyols. The polyol(s) preferably has a weight-average molecular weight ("Mw" as measured by gel permeation chromatography), from 250 to 8,000, more preferably from 250 to 3,000, and preferably has an acid number less than 5, more preferably less than 2.

Polyether polyols suitable for use in the present invention include polyoxy-$C_2$–$C_6$-alkylene polyols, including branched and unbranched alkylene groups. Examples of suitable polyether polyols include, for example, reaction products of alkylene oxides with polyhydric alcohols, polyethylene oxide, poly(1,2- and 1,3-propyleneoxide), poly(1,2-butyleneoxide), random or block copolymers of ethylene oxide and 1,2-propylene oxide, and mixtures thereof Mixtures of the various suitable polyether polyols are also suitable for use in the present invention. The preferred polyether polyols are polypropylene glycols, also known as polypropyleneoxides. The polyether polyol preferably has a weight average molecular weight ("Mw" as measured by gel permeation chromatography), from 800 to 8,000, more preferably from 1,000 to 3,000.

In the practice of the present invention, the preferred first polyols are polyester polyols, polyether polyols, and mixtures thereof. More preferred is a mixture containing at least one polyester polyol and at least one polyether polyol.

In the practice of the present invention, in addition to the first polyol, the components include at least one fatty polyol. "Fatty" means herein any compound that contains one or more residues of fatty acids. Fatty acids are well known in the art. They are described, for example, by R. A. Burns in *Fundamentals of Chemistry*, Third Edition (Prentice Hall, 1999). Fatty acids are long-chain carboxylic acids, with chain length of at least 4 carbon atoms. Typical fatty acids have chain length of 4 to 18 carbon atoms, though some have longer chains. Linear, branched, or cyclic aliphatic groups may be attached to the long chain. Fatty acid residues may be saturated or unsaturated, and they may contain functional groups, including for example alkyl groups, epoxide groups, halogens, sulfonate groups, or hydroxyl groups, that are either naturally occurring or that have been added. Suitable fatty polyols include, for example, fatty acids, esters of fatty acids, amides of fatty acids, and mixtures thereof, as long as the compound is a polyol. Further examples of suitable fatty polyols include, for example, dimers, trimers, oligomers, or polymers of fatty acids; dimers, trimers, oligomers, or polymers of esters of fatty acids; dimers, trimers, oligomers, or polymers of amides of fatty acids; dimers, trimers, oligomers, or polymers of mixtures of fatty acids, esters of fatty acids, and amides of fatty acids; or mixtures of such dimers, trimers, oligomers, or polymers, as long as the fatty compound is a polyol. The hydroxyl functions of a suitable fatty polyol may reside on the fatty acid residue, on other parts of the molecule, or on both.

One class of fatty polyols suitable for use in the present invention is the class of polyhydroxyl fatty acids. Polyhydroxyl fatty acids are not commonly found in nature, but naturally occurring polyhydroxyl fatty acids would be suitable. Polyhydroxyl fatty acids are more commonly made by hydroxylating (i.e., adding hydroxyl groups to) fatty acids. Several methods exist for hydroxylating fatty acids, usually by starting with an unsaturated fatty acid, which may be either artificial or naturally occurring. Suitable polyhydroxy fatty acids may be obtained by adding plural hydroxyl groups to a fatty acid, or by adding one or more hydroxyl groups to a fatty acid that naturally contains a hydroxyl group, such as ricinoleic acid or the acid residues of the oils derived from *Domorphotheca pluvialis* or *Lesquerella fendleri*. Any polyunsaturated fatty acid may be hydroxylated more than once to produce suitable polyhydroxyl fatty acids; some examples of polyunsaturated fatty acids include linoleic acid or the fatty acid residues of oils from rapeseed, linseed, soybean, tung, safflower, peanut, corn, or cottonseed. Most of the fatty acids used as fatty polyols or used for making fatty polyols are obtained from natural oils by cleaving the ester linkage (described herein below) between the fatty acid residue and the rest of the oil molecule.

A second class of fatty polyols suitable for use in the present invention is the class of esters of fatty acids, which have the chemical structure

where F is a fatty acid residue and R is an organic radical. The connection between F and R is known as an ester linkage. Such compounds are suitable if they have 2 or more hydroxyl groups. Such esters may be made by any of a wide variety of methods or may be found in nature. The radical R may have additional OH groups, some or all of which may be linked to other fatty acid residues through ester or other linkages. The other fatty acid residues, if present, may be the same as or different from F, and they may be the same as or different from each other. The hydroxyl groups may be all located on one or more of the fatty acid residues; they may be all located on R; or some may be on one or more fatty acid residues and some on R.

Within the class of suitable polyhdroxyl esters of fatty acids, one suitable group is the polyhydroxyl glycerides. Generally, glycerides are esters of fatty acids with glycerol, which has the chemical formula $HOCH_2CHOHCH_2OH$. When one, two, or three of the hydroxyl functions of glycerol is connected to a residue of a fatty acid by an ester linkage, the resulting compound is known as a mono-, di-, or triglyceride, respectively. A variety of triglycerides are found in nature and are known as fats, as described for example by R. T. Morrison and R. N. Boyd, in *Organic Chemistry*, 3rd edition, published by Allyn and Bacon, 1973. Most of the naturally occurring fats contain residues of fatty acids of several different lengths and/or compositions. Similarly, a variety of mono-, di-, and triglycerides of fatty acids, especially those found in nature, are known as oils. Herein, fats and oils are considered synonyms. Any glyceride, that has more than one hydroxyl group is a fatty polyol suitable for use in the present invention, except for unmodified castor oil and unmodified esters of ricinoleic acid, which are not included in the scope of fatty polyol as used in the present invention. The hydroxyl groups may be on the glycerol portion of the molecule, on one or more of the fatty acid residues, or on both. Some examples of glycerides suitable as fatty polyols in the present invention are glycerol stearate, glycerol monohydroxystearate, glycerol bis hydroxystearate, and glycerol tris hydroxystearate. Some other glycerides that are suitable as fatty polyols in the present invention are naturally occurring oils other than castor oil that have hydroxyl groups on the fatty acid residues, such as the oils of *Domorphotheca pluvialis* or *Lesquerella fendleri*.

Another group of suitable polyhydroxyl esters of fatty acids are esters of one or more fatty acids with multi-hydroxyl alcohols other than glycerol. Suitable multi-hydroxyl alcohols include, for example, ethylene glycol and the other diols suitable for making polyester polyols. Some examples of such esters are ethylene glycol hydroxystearate and propylene glycol hydroxystearate.

Many suitable fatty polyols that are esters of fatty acids can be made by forming derivatives of naturally occurring fats and/or naturally occurring oils. "Derivatives" herein means the results of chemical modification that does not break the ester linkages between the fatty acid residues and the rest of the oil and/or fat molecule. Methods of making derivatives of fatty compounds are taught by F. C. Naughton in "Castor Oil," in the *Kirk-Othmer Encyclopedia of Chemical Technology*, John Wiley & Sons, 1993. For example, if the fatty acid residue contains a double bond, some possible derivative modifications include hydrogenation, epoxidation, halogenation, or sulfonation at the double bond site. In other examples, if the fatty acid residue contains a hydroxyl, the hydroxyl group may be modified by methods including for example dehydration, halo genation, alkoxylation, esterification, or sulfonation. A derivative of a fatty acid ester is also called a "modified" form of that ester; in the absence of such a derivative modification, that ester would be referred to as "unmodified."

One set of suitable esters of fatty acids that are derivatives of natural oils is the set of hydroxylation products of natural triglycerides and hydroxylation products of their associated mono- and diglycerides. One method of hydroxylation of natural oils involves adding hydroxyl functionality to double bonds incorporated in the fatty acid residue of the oil. One method for hydroxylating a double bond in an oil is taught in UK Patent GB2278350B. Many natural oils have such double bonds, such as for example, soybean oil, linseed oil, rapeseed oil or tung oil. Thus, hydroxylated soybean oil, hydroxylated linseed oil, hydroxylated rapeseed oil, and hydroxylated tung oil, as long as they are polyols, are examples of fatty polyols suitable for use in the present invention. Similarly, a suitable fatty polyol will result when a mono- or diglyceride made from these oils is hydroxylated, as long as the product is a polyol.

One common triglyceride is castor oil, which is mostly the triglyceride of ricinoleic acid. Castor oil itself (i.e., unmodified castor oil) is not considered suitable as the fatty polyol of the present invention. Similarly, unmodified esters of ricinoleic acid are not considered suitable as the fatty polyol of the present invention. "Esters of ricinoleic acid" as used herein includes compounds with plural residues of ricinoleic acid, such as for example glycerol bis ricinoleate, but it does not include compounds that include one or more residues of fatty acids other than ricinoleic. Derivatives of castor oil and derivatives of esters of ricinoleic acid that have two or more hydroxyl functions (i.e., are polyhydroxyl) are suitable as the fatty polyol of the present invention. Such suitable derivatives include, for example, the results of hydrogenation, hydroxylation, alkyl hydroxylation, addition of other functionality, alcoholysis, hydrolysis, epoxidation, halogenation, sulfonation, or combinations thereof, when the resulting compounds are polyhydroxyl. Some examples of suitable derivatives of castor oil and/or esters of ricinoleic acid include hydrogenated castor oil and hydrogenated diglyceride of ricinoleic acid.

Any polyhydroxyl mono-, di-, or triglicerides of fatty acids other than ricinoleic will be suitable as the fatty polyol of the present invention. Derivatives thereof that are polyhydroxyl are also suitable.

Another class of fatty polyols suitable for use in the present invention is the group of polyhydroxyl oligomers and polymers of fats and/or oils, referred to collectively herein as "polymeric fatty polyols." Fats and/or oils can be oligomerized or polymerized by a variety of reactions; for example, if the fat or oil contains a double bond, it can be oligomerized or polymerized by oxidative polymerization at the double bond or by other reactions. The result of oligomerization or polymerization of a fat or oil will be referred to herein as a "polymerized oil." Polymerized oils suitable as the polymeric fatty polyol of the present invention include for example the results of oligomerizing and/or polymerizing oils; the results of oligomerizing and/or polymerizing modified oils; the results of co-oligomerizing and/or co-polymerizing mixtures of oils, including modified and/or unmodified oils. Also suitable are mixtures of polymeric fatty polyols and the results of modifying polymeric fatty polyols. One preferred polymerized oil is polymerized castor oil, which is sometimes called "blown oil." The polymerization can be carried out in a variety of processes; the results are often characterized by the viscosity of the polymerized castor oil. When polymerized castor oil is used in the present invention, polymerized castor oils with viscosity from 500 to 100,000 cps are suitable; preferred is 1,500 to 20,000 cps; more preferred is 1,500 to 15,000 cps; even more preferred is 2,500 to 4,000 cps.

One additional class of fatty polyols suitable for the practice of the present invention is the amides of fatty acids, which have the chemical formula $ACONR^1R^2$, where A is a fatty acid residue, and $R^1$ and $R^2$ are, independently, either hydrogen atoms or organic radicals. $R^1$ and $R^2$ may independently include fatty acid residues and/or functional groups. The hydroxyl groups may reside on any or all of A, $R^1$, or $R^2$, as long as the molecule has at least two hydroxyl groups. Suitable amides of fatty acids are based on the same variety of fatty acid residues as the suitable fatty acids and their esters as described above. One suitable group of amides of fatty acids have A that has a hydroxyl group; $R^1$ that is H; and $R^2$ that is an alkyl alcohol with 1 to 8 carbon atoms. An example of this group of amides is N(2 hydroxy ethyl) 12-hydroxystearamide. A second suitable group of amides of fatty acids have A that has a hydroxyl group; $R^1$ that is H;

and R² that has the formula R⁴NHCOR³, where R³ is a fatty acid with a hydroxyl group (either the same as or different from A) and R⁴ is an alkyl group with 1 to 8 carbon atoms. An example of this second group of amides is N,N' ethylene bis 12-hydroxystearamide.

Some preferred fatty polyols are the products of hydroxylation of unsaturated or polyunsaturated natural oils, the products of hydrogenations of unsaturated or polyunsaturated polyhydroxyl natural oils, polyhydroxyl esters of alkyl hydroxy fatty acids, polymerized natural oils, and alkylhydroxylated amides of fatty acids. More preferred are hydroxylated soybean oil, hydrogenated castor oil, polymerized castor oil, hydroxy ethyl ricinoleate, and hydroxy ethyl ricinoleamide. Most preferred is polymerized castor oil.

The amount of fatty polyol suitable for use in certain embodiments of the present invention is 0.5% to 50% by weight, based on the total weight of all polyols in the admixture of components. Preferred is 0.8% to 20%; more preferred is 1% to 9%; even more preferred is 2% to 8%, and most preferred is 3% to 6%.

In some embodiments of the present invention, the components include at least one anhydride-functional polymer. By "anhydride-functional polymer" herein is meant a resin, oligomer, or polymer that contains anhydride groups. The molecules of the anhydride-functional polymer will have, on average, at least one anhydride functional group per molecule. Anhydride-functional polymers may be made by copolymerizing at least one vinyl monomer and at least one vinyl-containing anhydride monomer. Suitable vinyl monomers include, for example, 1-alkenes such as for example butenes, hexenes, decenes, diisobutylene, and the like; hydrocarbon dienes; substituted dienes; acrylic and methacrylic acid; esters of acrylic and methacrylic acid; substituted esters of acrylic and methacrylic acid; styrene; substituted styrene; and mixtures thereof. Preferred is styrene. Suitable vinyl-containing anhydride monomers include, for example, maleic anhydride, alkene-substituted succinic anhydride, maleic anhydride adducts of methylcyclopentadienes, substituted versions thereof, and mixtures thereof. Preferred is maleic anhydride.

In embodiments of the present invention that include an anhydride-functional polymer, the preferred anhydride-functional polymers are copolymers of maleic anhydride with styrene, substituted styrene, or mixtures thereof. More preferred are styrene/maleic anhydride copolymers, also called "styrene/maleic anhydride copolymer resins" or "SMA Resins" or similar names. Styrene/maleic anhydride copolymers have been described in the publication "SMA Resins," available from Atofina Chemicals, Inc. By "styrene/maleic anhydride copolymer" herein is meant a copolymer containing at least 90 weight percent of copolymerized residues of styrene and maleic anhydride and containing from 0 to 10 weight percent of copolymerized residues of other monomers, based on the weight of the copolymer. Suitable styrene/maleic anhydride copolymers include styrene/maleic anhydride "base" copolymers, which are styrene/maleic anhydride copolymers that have not been modified by esterification or other chemical modifications; also included are "partially esterified" styrene/maleic anhydride copolymers, in which some of the anhydride groups have been reacted with organic alcohols to form carboxyl groups and ester groups; and also included are "fully esterified" styrene/maleic anhydride copolymers, in which all the anhydride groups have been reacted with organic alcohols. Preferred are partially esterified styrene/maleic anhydride copolymers.

In some embodiments of the present invention, the components include at least one styrene/allyl alcohol (SAA) addition copolymer having a hydroxyl number of 100–300 and Mn of 1,000–4,000. Such copolymers are commercially available from Lyondell Chemical, Houston, Texas such as SAA-100, disclosed to be 70 styrene/30 allyl alcohol, on a molar basis, and SAA-103, disclosed to be 80 styrene/20 allyl alcohol, on a molar basis. By "styrene/allyl alcohol addition copolymer" herein is mean a copolymer containing at least 90 weight percent of copolymerized residues of styrene and allyl alcohol but not excluding other copolymerized monomer(s) to an extent of less than 10 weight percent based on the weight of the copolymer.

Also contemplated in the practice of the present invention are copolymers made from monomer mixtures that include styrene, maleic anhydride, allyl alcohol, and up to 10% by weight other monomers, based on the weight of the monomer mixture.

The components of the present invention preferably contain less than 1% water, more preferably less than 0.2% water, and even more preferably less than 0.1%, by weight based on the total weight of the components.

The components may be mixed by conventional means, preferably in an inert, dry atmosphere, and reacted, preferably at a temperature of 50° C. to 120° C., preferably for a time sufficient to achieve a hydroxyl number of less than 25, more preferably for a time sufficient to achieve a hydroxyl number of less than 5. The anhydride-functional polymer, if used in the present invention, is preferably solubilized by heating and mixing with at least one of the non-isocyanate containing components before the reaction with the polyisocyanate. Optionally, a catalyst such as, for example, a tertiary amine or a tin-based catalyst may be admixed with the components, either before, during, or after the reaction to form the adhesive composition. When such an optional catalyst is used, the usual use level is less than 0.3% by weight based on the total weight of the admixed components. The adhesive composition of this invention, which is an NCO-functional adhesive, is stored, preferably under an inert, dry atmosphere until use.

The hot-melt adhesive composition may be formulated by admixing additional conventional ingredients such as fillers, pigments, tackifiers, plasticizers, rheology modifiers, thermoplastic acrylic resins, etc. with due regard to the reactivity of the NCO-functional groups, which is desirably maintained. In addition to the first polyol and fatty polyol required in the present invention, unmodified castor oil and/or unmodified esters of ricinoleic acid may be added to the components.

A useful method of characterizing the adhesive composition of the present invention is the free NCO content. The free NCO content is the weight percent, based on the total weight of the adhesive composition, of free NCO. Free NCO is the amount of NCO in excess of the amount needed to match the reactive H atoms present in the admixture on a 1:1 equivalents basis. Reactive H atoms are those believed to be likely to react fully or nearly fully with the NCO groups. Included in the reactive H atoms are those in hydroxyl groups and those in carboxyl groups. It is believed that, in some cases, if an anhydride group is present in the composition, the hydroxyl group on a polyol will react with the anhydride group to produce a carboxyl group and an ester linkage between the polyol and the anhydride-functional polymer. Those skilled in the art will recognize that this reaction, if it takes place, makes no net change in the number of reactive H atoms. In the practice of the present invention, suitable admixtures have free NCO content of 0.2% to 15%, preferably 0.5% to 10%, more preferably 1% to 8%.

In the practice of the present invention, the ratio of NCO/OH groups from all of the admixed components taken on an equivalents basis is between 1.3/1 and 5/1. The preferred ratio of NCO/OH groups will depend on the use to which the practioner of the present invention intends to put the adhesive. For many contemplated uses, the ratio is not critical, and ratio values of 1.4/1, 1.6/1, 1.8/1, 2/1, 2.2/1, 2.4/1, and 2.6/1 are all useful. For some uses, a high level of green strength (i.e., adhesion strength of the cool adhesive before the moisture cure reaction is complete) is desired, and for such uses, the preferred ratio of NCO/OH groups is between 1.9/1 and 2.9/1, more preferably between 2.0/1 and 2.8/1, even more preferably between 2.2/1 and 2.7/1, and most preferably between 2.3/1 and 2.4/1, in order to provide an adhesive composition with an excess of isocyanate groups.

In the method of the present invention for bonding substrates, the moisture-reactive hot-melt adhesive is heated in order to achieve a viscosity suitable for transporting the adhesive, such as by pumping or gravity feed, to the application equipment and for the application of the adhesive to a first substrate in the presence of moisture. The temperature should be high enough to achieve a suitable viscosity but low enough to avoid excessive degradation or other undesirable effects on the adhesive. Typical useful temperatures are in the range of 40° C. to 200° C., preferably 50° C. to 160° C., and more preferably 100° C. to 150° C.

The application of the adhesive may be effected by conventional means such as, for example, heated spray applicator, heated bead applicator, heated nozzle, and heated roll coater, to form a continuous or discontinuous film of adhesive, as desired. The adhesive may also be applied to the substrate by hand, for example with a hand-held tool such as for example a spatula or other applicator. The adhesive may typically be applied at a level of 50 to 250 g/m² (4–20 g/ft²) although in cases where one of the substrates is a fabric it may be applied at a level as low as 1–50 g/m². It is contemplated that the moisture, i.e., water, which is anticipated to effect reaction with the NCO-functional groups thereby increasing the ultimate cohesive strength of the applied adhesive, may be, for example, a result of ambient humidity, artificially increased or controlled humidified air, a mist of water droplets, or a spray of liquid water contacting the applied adhesive. It is further contemplated that the moisture may be augmented by other NCO-functional group-reactive ingredients such as, for example, amines. It is also further contemplated that the reaction between the polymer composition and moisture may be augmented by the presence of a catalyst, as described herein above, in the admixture. Then, the applied adhesive is contacted by a second substrate to provide a composite construction. Preferably, the adhesive is contacted by the second substrate while the adhesive has a temperature substantially above room temperature. The composite construction so formed is optionally subjected to applied pressure such as by passing it between rollers to effect increased contact of the substrates with the adhesive, and the composite construction is then cooled or allowed to cool. In another embodiment the adhesive may be simultaneously or sequentially applied to two surfaces of the first substrate, which adhesive-coated surfaces are then simultaneously or sequentially bonded to two further substrates, which may be the same or different. It is further contemplated that the composite construction may subsequently be bonded to other substrate(s) using the same or a different adhesive before or after the process described herein. The substrates to be bonded in the method of this invention may be the same or different and include, for example, metal, wood, consolidated wood products, paper, elastomers, woven and nonwoven fabrics, and plastics which may have smooth or structured surfaces and are provided in the form of rolls, sheets, films, foils, etc. They include, for example, lauan mahogany plywood, impregnated paper, extruded polystyrene foam, expanded polystyrene foam, fiberglass reinforced polyester, polyester fabric, high or low pressure laminate, plywood, aluminum, steel, polyvinyl chloride, synthetic rubber, polymer blends, and engineering plastics.

In some embodiments of the present invention, the substrates that are bonded are relatively thin and flat, and in such cases the composite article is a called a laminate or laminated structure.

It is to be understood that for purposes of the present specification and claims that the range and ratio limits recited herein can be combined. For example, if ranges of 40 to 200 and 50 to 160 are recited for a particular parameter, it is understood that the ranges of 40 to 160 and 50 to 200 are also contemplated.

The following examples are presented to illustrate the invention and the results obtained by the test procedures.

Test Procedures

Viscosity: The adhesive is heated to 100° C. A small portion is extracted with a hand-held spatula and spread onto a flat substrate such as Luaun wood. If the adhesive spreads easily and does not run off the substrate, the viscosity is judged "good."

Adhesion: Adhesive is spread onto one substrate as in the Viscosity test. While it is still hot, a second substrate is pressed onto the adhesive, and the composite is stored under ambient laboratory conditions for 24 to 48 hours. The pieces of substrate are then forced apart in a cleavage mode, and the mode of failure is observed. If one or both pieces of substrate is destroyed while the adhesive and its interfaces with substrate remained intact, adhesion is judged to be "excellent."

Definitions (the following abbreviations are used in the Examples):

| | |
|---|---|
| 2/4 MDI: | equimolar mixture of 2,4'-MDI and 4,4'-MDI (Bayer, Inc.) |
| DEG-PA: | diethyleneglycol-phthalic anhydride, (hydroxyl number approximately 56) (Stepanpol ™ PD-56, Stepan Chemical) |
| HCO: | Hydrogenated Castor Oil |
| HER: | Hydoxy Ethyl Ricinoleamide |
| MDI: | diphenylmethane diisocyanate |
| PPG: | polypropylene glycol (Mw approximately 1,000, PPG 1025, BASF Corp.) |
| SAA 100: | 70 styrene/30 allyl alcohol, molar basis, copolymer Mn = 1500, hydroxyl number = 210, Lyondell Chemical |
| SAA 103: | 80 styrene/20 allyl alcohol, molar basis, copolymer Mn = 3200, hydroxyl number = 125, Lyondell Chemical |
| SAMS: | Styrene/α-methyl Styrene copolymer resin |
| SMA: | styrene/maleic anhydride partially esterified copolymer (Mw approximately 7000, Atofina Chemicals, SMA 1440) |
| PSO: | Polyhydroxylated Soybean Oil |

EXAMPLES

Example 1

A one liter reaction vessel is set up with, a gas inlet tube, thermometer, stirrer and a heating jacket. 10 g SMA 1440 (styrene/maleic anhydride partially esterified polymer, Mw approximately 7000, Atofina Chemicals), 20 g. PPG 1025, and 15 g. polyhydroxylated soybean oil are added to the reaction vessel, and the temperature is raised to 110° C. with stirring. After 30 minutes at 110° C. and a vacuum of 711 mm (28 inches) of mercury, the temperature is lowered to 80° C. 105 g of a mixture of 2/4 MDI is added, and the temperature is held at 80–100° C. for one hour with stirring and under 711 mm (28 inches) of mercury. 270 g. of DEG-PA is added, and the reaction temperature is held at 80–100° C. for an additional hour with stirring under vacuum of 711 mm of mercury (28 inches) of mercury. At this time the reaction product is poured from the vessel hot, into a container which is then blanketed in dry nitrogen and sealed.

Examples 2–8

The following compositions are made using the method of Example 1 (Example 1 is also shown):

|  |  | 1 | 2 | 3 | 4 | 5 | 6 | 7 | 8 |
|---|---|---|---|---|---|---|---|---|---|
| Co-polymer | Type | SMA | SMA | SMA | SMA | SMA | SMA | SMA | SMA |
|  | % | 2.4 | 2.4 | 2.4 | 2.4 | 2.4 | 2.4 | 2.4 | 2.4 |
| Polyether Polyol | Type | PPG | PPG | PPG | PPG | PPG | PPG | PPG | PPG |
|  | % | 4.7 | 4.8 | 4.8 | 4.8 | 4.8 | 4.8 | 4.8 | 4.8 |
| Polyester Polyol | Type | DEG-PA | DEG-PA | DEG-PA | DEG-PA | DEG-PA | DEG-PA | DEG-PA | DEG-PA |
|  | % | 64.3 | 65.8 | 62.8 | 57.8 | 64.3 | 65.8 | 62.8 | 57.8 |
| Fatty Polyol | Type | PSO | PSO | PSO | PSO | HCO | HCO | HCO | HCO |
|  | % | 3.6 | 2 | 5 | 10 | 3.6 | 2 | 5 | 10 |
| Poly-Isocyanate | Type | 2/4 MDI | 2/4 MDI | 2/4 MDI | 2/4 MDI | 2/4 MDI | 2/4 MDI | 2/4 MDI | 2/4 MDI |
|  | % | 25 | 25 | 25 | 25 | 25 | 25 | 25 | 25 |

Examples 9–12

The following compositions are made using the methods of Example 1:

|  |  | 9 | 10 | 11 | 12 |
|---|---|---|---|---|---|
| Co-polymer | Type | SAA103 | SAA103 | SAA103 | SAA103 |
|  | % | 10 | 10 | 10 | 10 |
| Polyether Polyol | Type | PPG | PPG | PPG | PPG |
|  | % | 16 | 16 | 16 | 14 |
| Polyester Polyol | Type | DEG-PA | DEG-PA | DEG-PA | DEG-PA |
|  | % | 39.4 | 41 | 38 | 35 |
| Fatty Polyol | Type | HER | HER | HER | HER |
|  | % | 3.6 | 2 | 5 | 10 |
| Poly-Isocyanate | Type | 4,4' MDI | 4,4' MDI | 4,4' MDI | 4,4' MDI |
|  | % | 31 | 31 | 31 | 31 |

Examples 13–20

Using the methods of Example 1, the following compositions are made:

|  |  | 13 | 14 | 15 | 16 | 17 | 18 | 19 | 20 |
|---|---|---|---|---|---|---|---|---|---|
| Co-polymer | Type | SAA100 | SAA100 | SAA100 | SAA100 | SAA100 | SAA100 | SAA100 | SAA100 |
|  | % | 1.9 | 1.9 | 1.9 | 1.9 | 1.9 | 1.9 | 1.9 | 1.9 |
| Polyether Polyol | Type | PPG | PPG | PPG | PPG | PPG | PPG | PPG | PPG |
|  | % | 18.9 | 18.9 | 18 | 16 | 18.0 | 18.3 | 18 | 16 |
| Polyester Polyol | Type | DEG-PA | DEG-PA | DEG-PA | DEG-PA | DEG-PA | DEG-PA | DEG-PA | DEG-PA |
|  | % | 50.9 | 51.7 | 49.6 | 46.6 | 50.7 | 51.7 | 47.6 | 42.6 |
| Fatty Polyol | Type | PSO | PSO | PSO | PSO | HER | HER | HER | HER |
|  | % | 2.8 | 2 | 5 | 10 | 2.8 | 2 | 5 | 10 |
| Poly-Isocyanate | Type | 4,4' MDI | 4,4' MDI | 4,4' MDI | 4,4' MDI | 4,4' MDI | 4,4' MDI | 4,4' MDI | 4,4' MDI |
|  | % | 19.8 | 19.8 | 19.8 | 19.8 | 20.9 | 20.4 | 21.8 | 23.8 |
| Other Polymer | Type | SAMS | SAMS | SAMS | SAMS | SAMS | SAMS | SAMS | SAMS |
|  | % | 5.7 | 5.7 | 5.7 | 5.7 | 5.7 | 5.7 | 5.7 | 5.7 |

Example 21

Viscosity Tests

Examples 1–20 are tested for viscosity, and all are "good."

Example 22

Adhesion Tests

Examples 1–20 are tested for adhesion, and all are "excellent."

Examples 23–24

Using the methods of Example 1, the following compositions were made:

|  |  | 23 | 24 |
|---|---|---|---|
| Co-polymer | Type | SAA103 | SAA103 |
|  | % | 10 | 10 |
| Polyether Polyol | Type | PPG 1025 | PPG 1025 |
|  | % | 18.5 | 18.5 |
| Polyester Polyol | Type | PD 56 | PD 56 |
|  | % | 37 | 37 |
| Fatty Polyol | Type | Pale ™ 4* | Pale ™ 4* |
|  | % | 3 | 2 |
| Poly-Isocyanate | Type | 4,4' MDI | 4,4' MDI |
|  | % | 31.5 | 31.5 |
| Other | Type | none | Castor Oil |
|  | % |  | 1 |

(*)Pale ™ 4 is polymerized castor oil, Keloth International

Example 25

Viscosity Tests

Examples 23–24 were tested for viscosity, and all were "good."

Example 26

Adhesion Tests

Examples 23–24 were tested for adhesion, and all were "excellent."

I claim:

1. A moisture-reactive hot-melt composition formed by admixing components comprising
   (a) at least one first polyol selected from the group consisting of polyether polyols, polyester polyols, polyester ether polyols, polyether ester polyols, and mixtures thereof;
   (b) at least one polyisocyanate; and
   (c) at least one fatty polyol selected from the group consisting of hydroxylated soybean oil, hydrogenated castor oil, polmerized castor oil, hydroxy ethyl ricinoleamide, and mixtures thereof.

2. The composition of claim 1, wherein said components further comprise a functional copolymer selected from the group consisting of styrene/allyl alcohol copolymers, anhydride-functional copolymers, styrene/allyl alcohol/maleic anhydride copolymers, and mixtures thereof.

3. A moisture-reactive hot-melt composition formed by admixing components comprising
   (a) at lest one first polyol selected from the group consisting of polyether polyols, polyester polyols, polyester ether polyols, polyether ester polyols, and mixtures thereof, wherein said first polyol comprises at least one polyester polyol and at least one polyether polyol;
   (b) at least one polyisocyanate; and
   (c) at least one fatty polyol selected from the group consisting of polyhydroxyl fatty acids, polyhydroxyl amides of fatty acids, polyhydroxyl esters of fatty acids, polymeric fatty polyols, and mixtures thereof; wherein said fatty polyol does not contain unmodified castor oil or an unmodified ester of ricinoleic acid.

4. The composition of claim 1, wherein said polyisocyanate comprises at least one polyisocyanate compound selected from the group consisting of 2,4'-diphenylmetbane dilsocyanate, 4,4'-diphenylmethane diisocyanate, and mixtures thereof.

5. The composition of claim 1, wherein said components have a ratio of NCO/OH groups on an equivalents basis of from 1.8/1 to 3.0/1.

6. The composition of claim 1, wherein said components further comprise a functional copolymer selected from the group consisting of styrene/allyl alcohol copolyniers, anhydride-functional copolymers, styrene/ailyl alcohol/maleic anhydride copolymers, and mixtures thereof; wherein said first polyol comprises at least one polyester polyol and at least one polyether polyol; wherein said polyisocyanate comprises at least one polyisocyanate compound selected from the group consisting of 2,4'-diphenylmethane diisocyanaze, 4,4'-dlpbenylmethane diisocyanate. and mixtures thereof; and wherein said components have a ratio of NCO/OH groups on an equivalents basis of from 1.8/1 to 3.0/1.

7. A method for bonding substrates comprising
   (a) making a moisture-reactive hot-melt composition by a method comprising admixing components comprising at least one first polyol selected from the group consisting of polyether polyols, polyester polyols, polyester ether polyols, polyether ester polyols, and mixtures thereof; at least one polyisocyanate; and at least one fatty polyol selected from the group consisting of hydroxylated soybean oil, hydrogenated castor oil, polymerized castor oil, hydroxy ethyl ricinoleamide, and mixtures thereof;
   (b) heating said polymer composition;
   (c) applying said heated polymer composition to a first substrate in the presence of moisture;
   (d) contacting said applied heated polymer composition with a second substrate; and
   (e) cooling, or allowing to cool, said polymer composition.

8. The method of claim 7, wherein said components further comprise a functional copolymer selected from the group consisting of styrene/allyl alcohol copolymers, anhydride-functional copolymers, styrene/allyl alcohol/maleic anhydride copolymers, and mixtures thereof; wherein said first polyol comprises at least one polyester polyol and at least one polyether polyol; wherein said polyisocyanate comprises at least one polyisocyanate compound selected from the group consisting of 2,4'-diphenylmetbane diisocysnate, 4,4'-diphenylmethane diisocyanate, and mixtures thereof; and wherein said components have a ratio of NCO/OH groups on an equivalents basis of from 1.8/1 to 3.0/1.

9. The composition of claim 1, wherein said fatty polyol is selected from the group consisting of hydroxylated soybean oil, hydrogenated castor oil, polymerized castor oil, and mixtures thereof.

10. The method of claim 7, wherein said fatty polyol is selected from the group consisting of hydroxylated soybean oil, hydrogenated castor oil, polymerized castor oil, and mixtures thereof.

* * * * *